Jan. 31, 1933. J. H. SHAPLEIGH 1,895,492
METHOD OF AND APPARATUS FOR CONCENTRATING NITRIC ACID
Filed Oct. 17, 1929

WITNESS:

INVENTOR
James H. Shapleigh
BY
Busser & Harding
ATTORNEYS.

Patented Jan. 31, 1933

1,895,492

UNITED STATES PATENT OFFICE

JAMES H. SHAPLEIGH, OF MOUNT LAKES, NEW JERSEY, ASSIGNOR TO HERCULES POWDER COMPANY, OF WILMINGTON, DELAWARE, A CORPORATION OF DELAWARE

METHOD OF AND APPARATUS FOR CONCENTRATING NITRIC ACID

Application filed October 17, 1929. Serial No. 400,198.

This invention relates to a process of concentrating nitric acid and apparatus therefor; and has more particular reference to a process involving the treatment of the dilute acid with a dehydrating agent followed by the vaporization of concentrated nitric acid from the mixture.

In concentrating nitric acid by the treatment thereof with a dehydrating agent such as sulphuric acid, it was first proposed that the nitric acid could be vaporized from the mixture as it passed through a packed column by the application of external heat. Various disadvantages arose in carrying out this process because of overheating which resulted in the formation of nitroso-sulphuric acid and decomposition of the nitric acid. On the other hand, if a low temperature was used to avoid overheating, the nitric acid was not completely removed from the residual acid.

Attempts to improve this process by causing hot gases to flow in countercurrent relationship with the acidic mixture had similar objectionable features and in addition resulted in a loss of acid in the exhausted gases.

A more satisfactory process resulted when steam was used in place of the hot gases inasmuch as the steam was absorbed in the acid mixture whereby its latent heat of vaporization and heat of combination with sulphuric acid became available to evaporate the nitric acid. In this process, since the temperature never rose substantially above the boiling point of the mixture at any point, overheating was avoided. It was found, however, that the limit of economy in this process was reached when the residual acid had a strength of 62–65% $H_2SO_4$. Any attempt to decrease the sulphuric acid component to give a more economical use of the sulphuric acid resulted in an incompletely denitrated product. This failure of the process is due to the fact that the boiling points of mixtures passing through the tower first rise and then fall, making it impossible to use steam with mixtures containing a high ratio of nitric acid to sulphuric acid.

In the improved process complete recovery of concentrated nitric acid may be obtained from a mixture containing 42% $HNO_3$, 38% $H_2SO_4$ and 20% $H_2O$. On the other hand, the most economical results from the process using steam as above described necessitate a mixture rich in sulphuric acid, as represented by the composition 27.5% $HNO_3$, 63.5% $H_2SO_4$, and 9% $H_2O$.

The objects of the improved process involving the attainment of high economy of sulphuric acid will be apparent from the following description of a desirable form of apparatus and its use read in conjunction with the accompanying drawing in which.

Figures 1, 2:
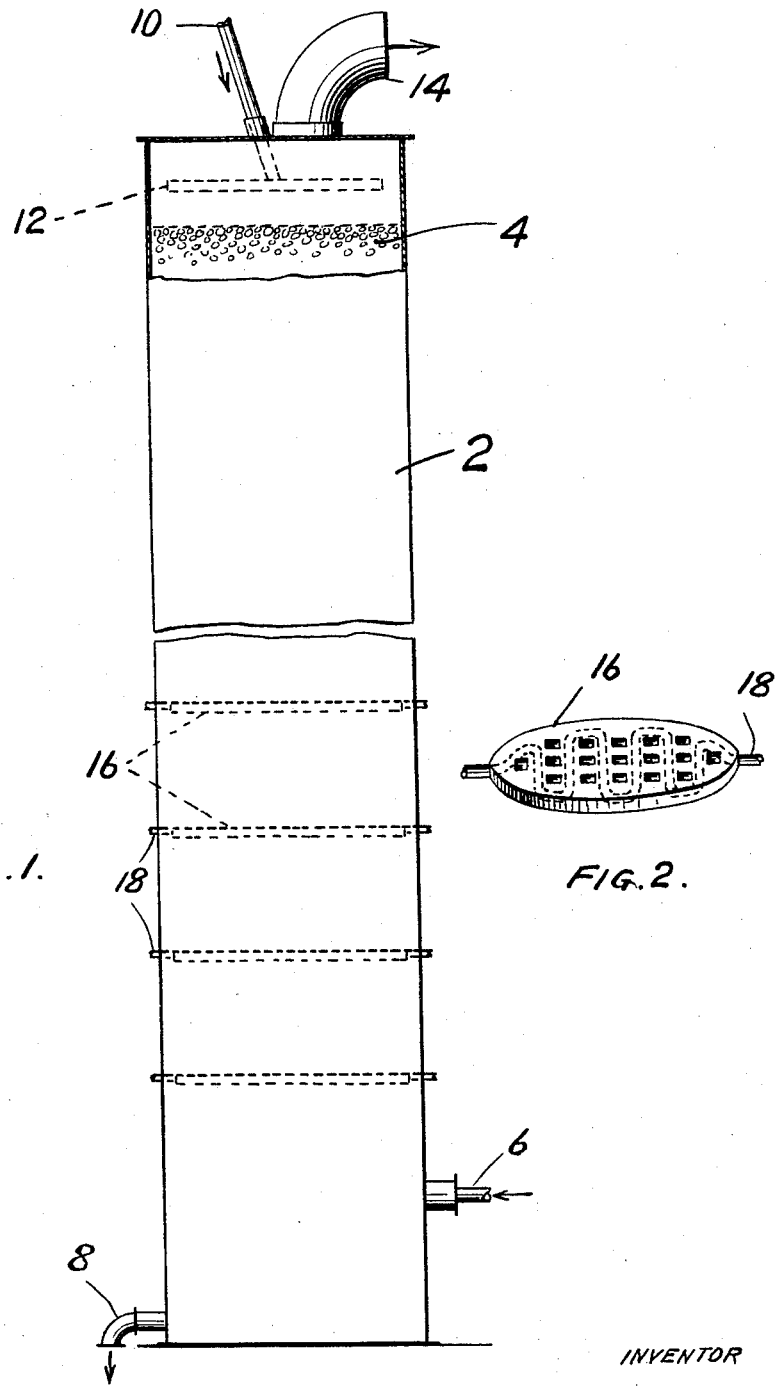
Fig. 1 is an elevation, partly in section, of a concentrating tower.
Fig. 2 is a perspective view of a heating element used in the tower.

The apparatus consists of a tower 2 of the usual construction used in concentration or absorption process involving the use of mineral acids, the tower being packed, as indicated at 4, in the customary manner to produce a large area of contact between liquids and gases passing therethrough. Steam or some other hot gaseous medium enters the bottom of the tower at 6, an exit 8 being provided at the bottom of the tower for the residual mixture of sulphuric acid and water.

The mixture of acids is led into the top of the tower through a pipe 10, the lower end of which terminates in a spray head 12 arranged to spread the acids over the packing. An exit pipe 14 leads the concentrated nitric acid vapors to a suitable condenser.

In the lower portions of the tower are located perforated heater plates 16 adapted to be heated by steam or other hot gases passing through coils 18 therein or by electricity through resistance coils therein. The packing 4 fills the spaces between these plates as well as the upper portions of the tower.

In the method heretofore used involving the passage of steam in countercurrent relationship to the downwardly flowing acid mixture, it was necessary to start with a mixture containing a sufficiently large percentage of sulphuric acid so that, as the mixture descended and nitric acid was vaporized, the boiling point of the remaining acid mixture would continue to rise until the bottom of the tower was reached. This necessitated a residual acid mixture containing at least 62-65% $H_2SO_4$.

If a mixture was used having a lower content of $H_2SO_4$ so that the residual acid would contain less $H_2SO_4$, the boiling points would first rise and then fall during the passage through the tower, and nitric acid would not evaporate off to a desired extent after the maximum boiling point was reached. Consequently the denitrification would be incomplete.

In the improved method, preferably carried out in an apparatus of the kind described, a mixture of this latter type is used. During the initial part of the flow denitrification occurs in the usual manner, the steam heating the acid mixture and being absorbed by the sulphuric acid, while the nitric acid vaporizes and passes to the condenser through pipe 14. During this part of the process the boiling point of the remaining mixture of sulphuric and nitric acids and water rises until a mixture of maximum boiling point is obtained.

It is from this point downward that the heaters 16 are provided in order to maintain the temperature during the subsequent flow at least at the temperature of the boiling point of the maximum boiling mixture. By maintaining this temperature, both water and nitric acid are evaporated from the mixture, the steam produced augmenting the introduced steam and being absorbed higher up while the nitric acid vapors pass upwardly through the tower and pass over with those produced in the first part of the process. It will thus be seen that some of the water goes through a cyclic process, being evaporated in the lower part of the tower and re-absorbed higher up.

Preferably the temperature is maintained slightly higher than the maximum boiling point, although for economy it is preferable to add as little heat through plates 16, as is necessary in order to insure complete denitrification. In this way the steam is most efficiently used, the additional heat being added only to maintain the process operative in the zone where the boiling points would normally be decreasing.

As an example of the practice of the process, a mixture of 42% $HNO_3$, 38% $H_2SO_4$, and 20% $H_2O$ was passed into the top of the tower, steam being forced upwardly through the tower. With this mixture a maximum boiling point of about 130° C. was reached in the intermediate portion of the tower as the nitric acid was displaced by the steam. Below the point where this maximum boiling mixture was produced, the heaters were used to indirectly heat both acid and steam to maintain, preferably, slightly higher than an isothermal path, the residual acid temperature being about 186° C. The residual acid which was substantially completely denitrified was found to contain 58% $H_2SO_4$. The nitric acid obtained was of 95% strength. This process represents the use of 90 parts of $H_2SO_4$ per 100 parts of $HNO_3$ as compared with the use of 230 parts of $H_2SO_4$ per 100 parts of $HNO_3$ in the most efficient process carried out without the use of added heat.

While there has been described one form of apparatus and the process as applied to the denitration of one specific mixture, it will be understood that the conditions of the process will vary with the mixtures employed, since any mixture having concentrated nitric acid vapor in equilibrium with it at its boiling point may be concentrated by this method. Other means for supplying external heat may be used although the means described, which insure uniform heating of the liquid and vapors, are preferred. It will be obvious that an isothermal path is most efficient although slightly higher temperatures are preferably used to insure completeness of the process and to make up radiation or conduction losses.

While steam is the ideal gaseous medium inasmuch as it is absorbed by the acid, hot air or other gases may be used either alone or mixed with steam. Obviously, the conditions will then change somewhat, since the maximum boiling mixture would be reached at a different point in the process.

Although for maximum economy, it is undesirable to supply external heat prior to the attainment of a maximum boiling mixture, it will be obvious that under some circumstances external heat might be added prior to this point; or, the application of external heat might be deferred until some time after the attainment of the maximum boiling mixture, depending upon the composition of the mixture. Furthermore, if it was desirable to have some nitric acid remain in the residual acid, the process would not necessarily be carried to completion. Variations of this sort wherein some advantages of the process may be sacrificed to satisfy specific conditions are not, of course, intended to be excluded from the scope of the following claims.

What I claim and desire to protect by Letters Patent is:—

1. An apparatus for concentrating nitric acid including an upright tower, packing within the tower, a conduit for leading a mixture of nitric acid, sulphuric acid and water into the top of the tower, a conduit for leading nitric acid vapors from the top of the tower, a conduit for leading a hot gaseous medium into the bottom of the tower, a conduit for leading liquid from the bottom of the tower, and indirect heating means adapted to impart heat to the mixture therein below the top thereof.

2. An apparatus for concentrating nitric acid including an upright tower, packing within the tower, a conduit for leading a mixture of nitric acid, sulphuric acid and water into the top of the tower, a conduit for leading nitric acid vapors from the top of the tower, a conduit for leading a hot gaseous medium into the bottom of the tower, a conduit for leading liquid from the bottom of the tower, and heating means adapted to impart heat to the mixture therein, said heating means comprising perforated plates arranged transversely to the tower and means for heating the plates.

3. The method of concentrating nitric acid, including flowing a mixture of nitric acid, sulphuric acid and water through a path, directly heating the mixture internally throughout its flow in the path and in a portion of the path subjecting the mixture additionally to indirect external heating.

4. The method of concentrating nitric acid including flowing a mixture of nitric acid, sulphuric acid and water through a path, counterflowing steam with the mixture through the path and in a portion of the path subjecting the mixture in its flow to indirect heating.

5. An apparatus for concentrating nitric acid including means forming an enclosed passage, means for introducing nitric acid, sulphuric acid and water into the passage, a conduit for leading nitric acid vapors from the passage, a conduit for leading hot gaseous medium from an external source into the passage, a conduit for leading liquid from the passage and indirect heating means adapted for heating the interior of the passage at a point spaced from the point of introduction of said acids and water and between the point of introduction thereof and the point of introduction of said hot gaseous medium.

6. An apparatus for concentrating nitric acid including means forming an enclosed passage, means for introducing nitric acid, sulphuric acid and water into the passage, a conduit for leading nitric acid vapors from the passage, a conduit for leading hot gaseous medium from an external source into the passage, a conduit for leading liquid from the passage, indirect heating means adapted for heating the interior of the passage at a point spaced from the point of introduction of said acids and water and between the point of introduction thereof and the point of introduction of said hot gaseous medium and packing positioned within the passage.

7. The method of concentrating nitric acid which includes counterflowing a mixture of nitric acid, sulphuric acid and water with a hot gaseous medium introduced from an external source into the path of flow of the mixture whereby the mixture is directly heated in its initial flow and simultaneously indirectly heating the mixture during a part of its counterflow with the hot gaseous medium and while the mixture still contains a substantial amount of nitric acid.

8. The method of concentrating nitric acid which includes counterflowing a mixture of nitric acid, sulphuric acid and water with steam introduced from an external source into the path of flow of the mixture whereby the mixture is directly heated in its initial flow and simultaneously indirectly heating the mixture during a part of its counterflow with the steam and while the mixture still contains a substantial amount of nitric acid.

9. The method of concentrating nitric acid which includes counterflowing a mixture of nitric acid, sulphuric acid and water, the nitric and sulphuric acids being in about the proportion of one to one, with a hot gaseous medium introduced from an external source into the path of flow of the mixture whereby the mixture is directly heated in its initial flow and simultaneously indirectly heating the mixture during a part of its counterflow with the steam and while the mixture still contains a substantial amount of nitric acid.

In testimony of which invention, I have hereunto set my hand, at Kenvil, N. J., on this 9th day of October, 1929.

JAMES H. SHAPLEIGH.